Dec. 24, 1957    M. LOUTREL    2,817,780
VENTILATION OF ELECTRIC MOTORS
Filed Aug. 3, 1955    2 Sheets-Sheet 1

United States Patent Office 2,817,780
Patented Dec. 24, 1957

2,817,780

VENTILATION OF ELECTRIC MOTORS

Maurice Loutrel, Paris, France, assignor, by mesne assignments, to Societe Anonyme "Normacem," Paris, France Application August 3, 1955, Serial No. 526,170

Claims priority, application France December 30, 1954

6 Claims. (Cl. 310—59)

An object of the present invention is an improvement in the cooling devices for rotary electric machines, particularly those of small size. These machines comprise a stator and a rotor arranged coaxially inside a casing and separated by an air gap, the shaft of the rotor extending outside said casing, the latter being formed by the assembly of the frame and flanges in their various possible realisations, it being also understood that the frame may be omitted, the flanges then being connected with the magnetic circuit of said stator.

This improvement is characterized in that the magnetic circuit of the stator is constituted by at least two parts separated in the longitudinal direction of the machine by an apertured cross-brace extending transversally outside of said casing, suitably apertured to that effect, in that at least one fan is mounted on the shaft outside the casing, preferably in the vicinity thereof, and in that apertures have been provided in said casing for cooperating with the blades of the fan or fans, in such a manner that the air outside the casing be sucked in at least through the cross-brace between the two said portions of the magnetic circuit, go through the air gap and ventilation longitudinal ducts provided to that effect, if any, in the two said portions, then escape through said apertures in the casing.

There is given hereinafter, by way of non limitative examples, the description of three embodiments according to the invention, applied to an induction motor of any type, the rotor being possibly of the wound type or of the squirrel-cage type.

Figure 1:
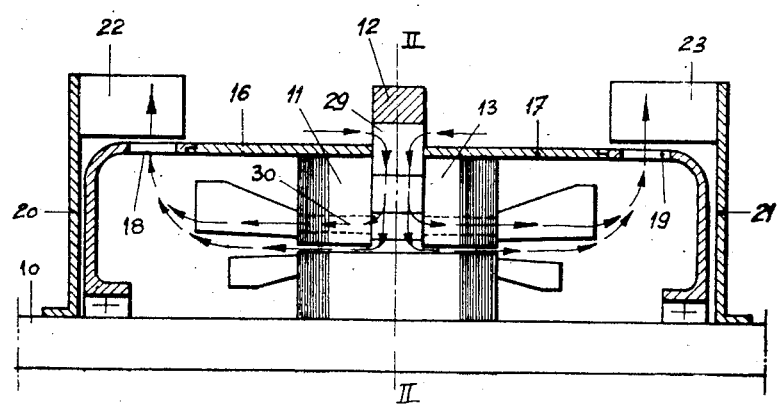
Figure 1 shows a motor according to the invention in longitudinal half section.
Figure 2:
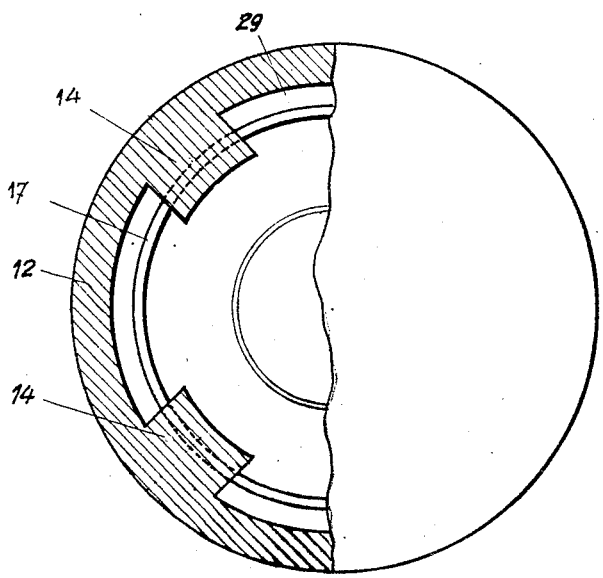
Figure 2 is a part section of Figure 1 along II—II.

The motor shown in Figure 1 has a fixed magnetic circuit and a frame which are each formed of two portions, respectively, 11, 13 and 16, 17 separated by a part 12. This part 12, a part section of which along the axis II—II is given in Figure 2, carries, at 14, in any number, teeth forming cross pieces between the two portions of the fixed magnetic circuit and of the frame. The flanges 6 and 7, or the two portions of the frame according to their respective dimensions, are provided, on their peripheries, with apertures 18, 19 in any number. On the shaft 10 and associated therewith, parts 20 and 21 are mounted, carrying blades 22 and 23 in any desired number constituting two fans surrounding the flanges.

The ventilation circuits and the directions of flow of the air are given by the arrows.

The air enters the motor through apertures 29 constituted by intervals between the teeth 14 of the part 12. It circulates through the windings in their portion between the two parts 11 and 13 of the fixed magnetic circuit, the longitudinal ventilation channels 30 if any, the air gap, and comes out through the spool heads through apertures 18, 19 provided in the flanges or in the frame and through the ventilation blades 22, 23.

Figure 3:
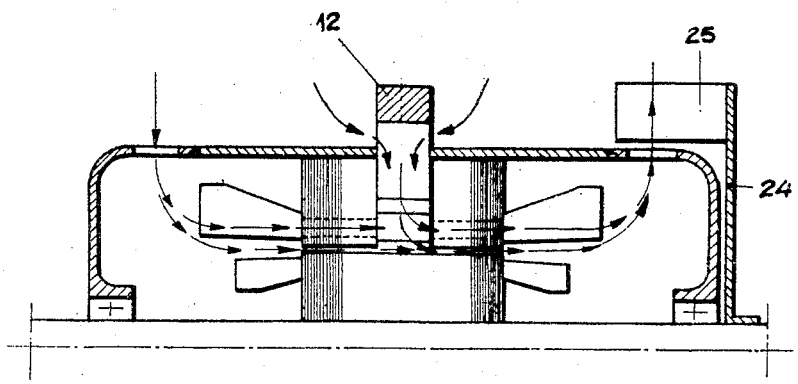
Figures 3 and 4 show, in longitudinal half-section, modified embodiments.

In another non-limitative arrangement of the invention represented in Figure 3, a single part 24 is provided, fitted with blades 25 forming a fan. The paths of the cooling air are then those indicated by the arrows.

In a motor built according to one of the Figures 1 or 3 the securing of said motor may be effected by means of any device associated either with the cross-piece or the frame or the fixed magnetic circuit.

Figure 4:
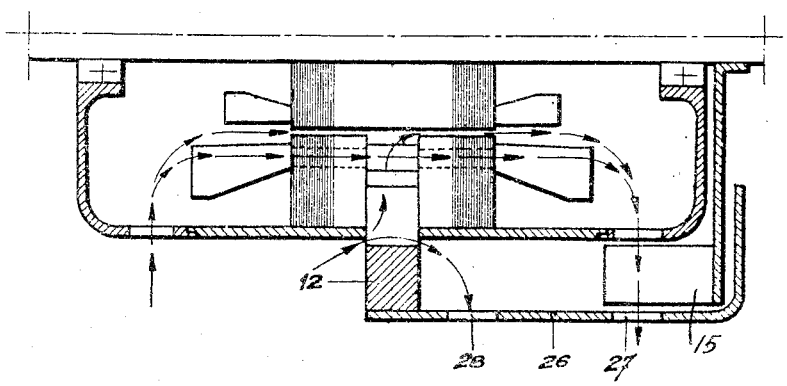

According to another arrangement of the invention, represented in Figure 4, the cross piece 12 supports casing parts 26 provided with holes, suitably arranged, 27, 28, for ensuring the ventilation. These parts 26 form a protection against an accidental contact with the blades 15 of the ventilators, in motion. They may, within the scope of the invention, be associated with the frame or the fixed magnetic circuit. Similarly, they may be used for securing the motor on a suitable support. As appears clearly from the examples described, the ventilation obtained according to the present invention is extremely efficient, particularly for small size machines, as it actuates fans of large dimensions, which makes it possible to decrease still more the size of said machines.

It should be understood finally that the present invention applies to all other types of rotary electric machines, whatever may be the designs of their magnetic circuits, of their windings, and of their accessory elements such as commutators or the like.

What I claim is:

1. A rotary electric machine with improved ventilating means, which comprises a pair of cylindrical casing halves of same diameter, each casing half having on one side an open circular contour and on the opposite side an end portion formed with a circular axial aperture and a series of ports disposed at spaced intervals in the vicinity of said end portion, a spacing and assembling ring having an inner diameter greater than the diameter of said cylindrical casing halves, said ring carrying a number of inner radial extensions and being disposed coaxially between said circular contours of said cylindrical casing halves, said two contours being rigidly secured on either side of said radial extension of said ring, whereby gaps limited by the said two contours and the said extensions form ventilating air inlets, a shaft rotatably mounted in the circular apertures of the ends of said two cylindrical casing halves and having its tips projecting on either sides from said ends, a rotor rigidly coaxial with said shaft, a pair of stator halves mounted coaxially around said rotor and separated therefrom by an air gap, said pair of stator halves registering with each other and being rigidly mounted on either sides of said radial extensions of said spacing and assembling ring, and at least one ventilating blade rigidly mounted on each tip of said shaft, each of said blades extending against one of said cylindrical casing halves and being adapted during its rotation to move past said holes formed in the relevant cylindrical casing half and to thus suck out ventilating air which enters through the aforementioned air inlets.

2. A rotary electric machine as claimed in claim 1, wherein said two stator halves are formed with ventilating air ducts parallel to said shaft.

3. A rotary electric machine as claimed in claim 1, in which the spacing and assembling ring is adapted for the fastening of the machine.

4. A rotary electric machine as claimed in claim 1, in which an additional casing is secured on the spacing and assembling ring and surrounds each one of the fans, at least in part.

5. A rotary electric machine as claimed in claim 4, in which the additional casing is provided with apertures intended for allowing the ventilating air to escape outside the machine.

6. A rotary electric machine with improved ventilating means, which comprises a pair of cylindrical casing halves of same diameter, each of said cylindrical casing halves having on one side an open circular contour and on the opposite side an end portion formed with a circular axial aperture, and having spaced peripheral holes formed therein near said end portion, a spacing and assembling ring having an inner diameter greater than the diameter of said cylindrical casing halves, said ring carrying a plurality of inner radial extensions limited inwards in a cylinder of a diameter smaller than the diameter of said cylindrical casing halves, said pair of cylindrical casing halves being mounted coaxially to said ring and to one another by having their circular contours secured on either side of said inner radial extensions of said ring, whereby said extensions comprise portions extending radially inside said cylindrical casing halves to delimit in said ring and between the two circular contours of said cylindrical casing halves a plurality of passages leading to the inside of said cylindrical casing halves, a shaft journalled for rotation in said circular apertures at the ends of said pair of cylindrical casing halves and formed with stub portions projecting on either side of said end portions, a rotor rigidly coaxial with said shaft, two stator halves mounted coaxially to said rotor with an annular clearance forming an air-gap between said rotor and stator halves by fixation of said stator halves on either side of those portions of the radial inner extensions of said spacing and assembling ring which extend radially inside said cylindrical casing halves, said stator halves being thus separated from each other by an interval, the passages delimited between the circular contours of said cylindrical casing halves opening into said interval, and at least one ventilating blade rigidly mounted on at least one of said stub portions of said shaft, said blade extending towards one of said cylindrical casing halves and moving during its rotation past the holes formed in said one cylindrical casing half so as to suck out the ventilating air having penetrated inside said cylindrical casing halves at least partially through the passages left between the circular contours of said cylindrical casing halves and flowing through the interval between said stator halves and the annular gap left between said stator halves and said rotor.

References Cited in the file of this patent

UNITED STATES PATENTS

| | | |
|---|---|---|
| 1,318,756 | Hellmund | Oct. 14, 1919 |
| 2,413,525 | Smith | Dec. 31, 1946 |

FOREIGN PATENTS

| | | |
|---|---|---|
| 216,232 | Switzerland | Nov. 17, 1941 |
| 461,537 | Great Britain | Feb. 18, 1937 |